UNITED STATES PATENT OFFICE.

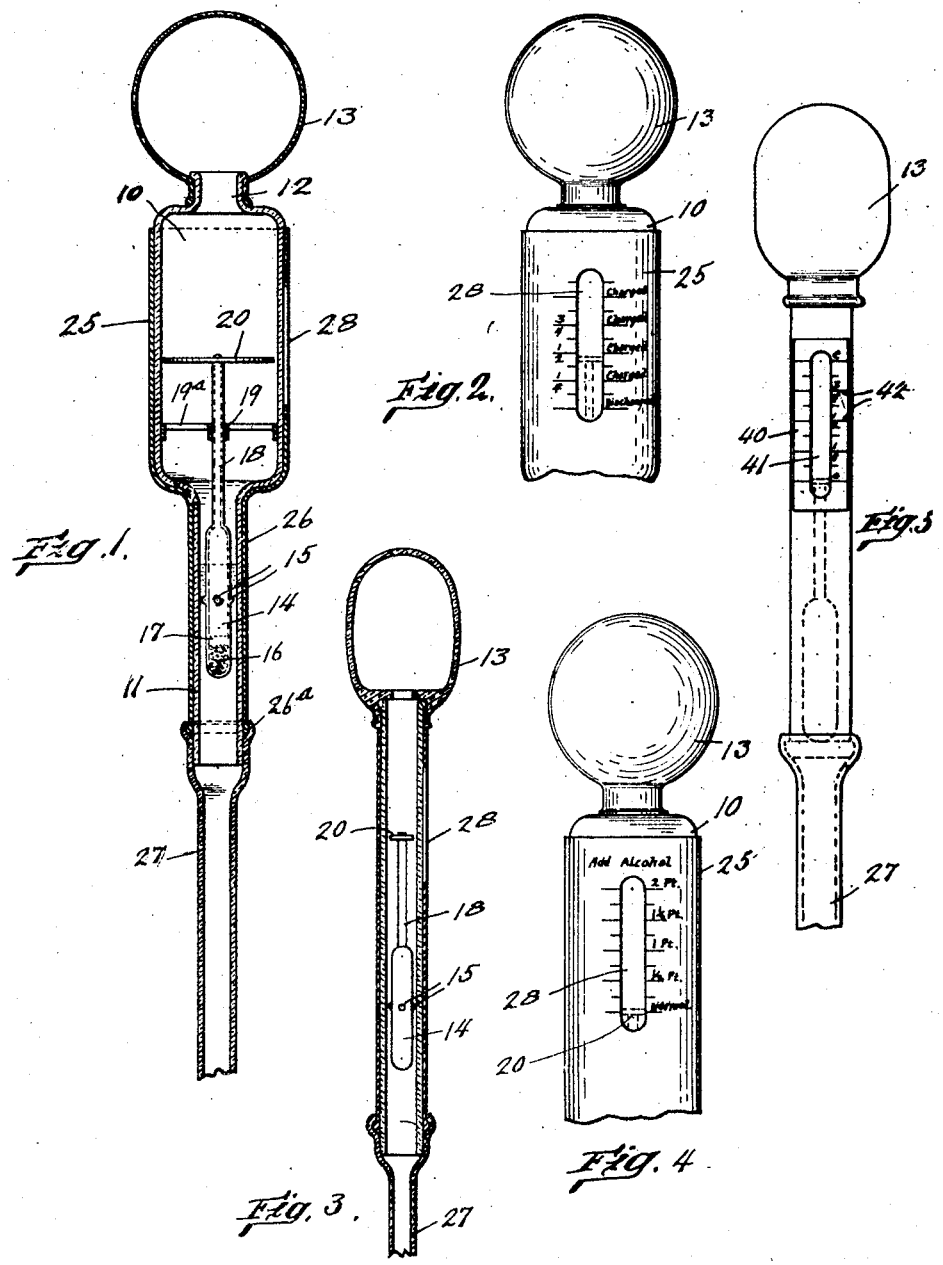

LOUIS J. STERN, OF BOSTON, MASSACHUSETTS.

HYDROMETER.

1,367,436.

Specification of Letters Patent.

Patented Feb. 1, 1921.

Application filed August 18, 1919. Serial No. 318,096.

*To all whom it may concern:*

Be it known that I, LOUIS J. STERN, a citizen of the United States, and resident of Boston, in the county of Suffolk and State of Massachusetts, have invented an Improvement in Hydrometers, of which the following is a specification.

This invention relates to hydrometers and has more particular reference to such devices adapted to be particularly employed in connection with automobiles for determining the condition of the storage batteries, the condition of the liquid in the cooling system, and the like.

The object of my invention is to provide a hydrometer of improved construction, which will indicate directly the condition of the device tested, and which may be easily and conveniently read.

Figure 1 is a sectional view of a hydrometer embodying my invention.

Fig. 2 is a front view of the hydrometer in detail, illustrating the window therein and the scale thereon.

Fig. 3 is a sectional view illustrating a slightly modified form of hydrometer.

Fig. 4 is a detail of the hydrometer having a scale for measuring the condition of the cooling system of an automobile.

Fig. 5 is a front view of a hydrometer having a scale affixed directly to the transparent casing.

As here shown in Figs. 1 and 2 the hydrometer includes the inner casing of glass, celluloid, or the like having the upper enlarged cylindrical portion 10 and the lower tube or stem portion 11. Said upper portion 10 terminates in a reduced neck portion 12 over which is extended the flexible compressible rubber bulb 13 by the manipulation of which liquid is drawn into and expelled from the inner casing in the usual manner. Said inner casing is preferably formed of a single length of tubing molded or otherwise manipulated into the form herein shown.

A hydrometer float is inclosed within said inner casing. Said hydrometer float comprises the bulb portion 14 which is relatively long as compared with its diameter and when the hydrometer is not in use is adapted to rest within the reduced or tube portion 11 of the casing. Said bulb is adapted to be a relatively loose fit within the reduced portion 11 and a plurality of nubs 15 of glass are formed thereon which serve as bearing points to maintain the bulb 14 away from the walls of said portion 11 and yet permit the hydrometer float to freely move therein when it is buoyed up by the liquid drawn into the hydrometer. The bulb 14 has received therein the usual predetermined weight comprising a plurality of fine short or other granular substance 16 which may be held in place by the packing 17. A relatively slender stem 18 extends upwardly from the bulb 14 and integrally formed therewith into the enlarged or cylindrical portion 10 of the hydrometer casing and terminates in a relatively thin disk 20 which is integral with the hydrometer float stem, although, obviously, it may be otherwise secured thereto, and said disk is adapted to be slightly less than the inner diameter of said cylindrical portion 10.

Said stem 18 is retained in a more or less central position in the casing or in such a position therein that the disk 20 is clear of the wall thereof by the bearing or guide 19 which comprises a disk of suitable material frictionally or otherwise received within said portion 10 and in which said stem may freely move. Said guide 19 has suitable perforations 19$^a$ therein to permit fluid to enter the upper part of the casing.

Said disk 20 constitutes an indicator or pointer which coöperates with a scale or indications to be described, to indicate in suitable terms the condition of the device measured.

Said inner casing, of glass or other relatively fragile material, is inclosed in an outer opaque casing of some relatively strong material as copper or steel.

Said outer casing comprises the upper cylindrical portion 25 in which the corresponding cylindrical portion 10 of the inner casing is closely received, and a lower tubular portion 26 in which the tubular portion 11 of the inner casing is also closely received. Preferably the two casings are cemented or otherwise secured together to form a unitary structure. Said portion 11 of the inner casing is adapted to extend a substantial distance beyond the end of the corresponding portion 26 of the outer and metallic casing and a rubber tube 27 or the like is adapted to be extended over both said end 11 and the portion 26 which is provided with a lip 26$^a$ whereby to retain said tube in place. Said tube closely engages the extended end of the inner casing whereby to prevent liquid from contacting with the outer metallic casing.

The upper portion 25 of the otherwise opaque outer metallic casing is formed with a slot or window 28 therein the greater extent of which is along the length of the casing, and a plurality of graduations or indications are engraved or otherwise formed on said casing adjacent said slot or window. Said disk 20 of the hydrometer float is visible through said slot 28 and may be painted with some distinctive color to increase its visibility and is arranged to coöperate with the scale carried by the hydrometer casing adjacent said slot to indicate the condition of the battery or other device tested. The scale or indications may be labeled, "Battery charged," "Battery half charged," "Discharged," etc., whereby the condition of the battery may be immediately determined or, if the device is employed for other purposes, other suitable indications will be provided. In Fig. 4, for instance, I have indicated a hydrometer for use in measuring the condition of the water or anti-freezing mixture in the cooling system of an automobile. In this figure the scale is so calibrated that with a certain specific gravity or weight of the mixture the disk or pointer 20 will assume a position adjacent an indication which may read, "Add one half pint alcohol," or it may indicate that a pint of alcohol, or whatever anti-freezing mixture is employed, is to be added.

In Fig. 3 I have employed a straight tubular inner casing of glass and a straight outer casing or jacket of metal having a slot through which the disk of the hydrometer float may be observed.

The construction is otherwise the same as above described.

It may be desirable, in some instances, to apply the scale or indications directly to the glass casing and not employ an outer protective casing. In this case the scale 40 may be suitably applied as by a transfer and may have the slot 41 and suitable indications 42, as in Fig. 5.

It is obvious that many modifications of my invention may be made without departing from the spirit thereof.

I claim:—

1. The combination, of a transparent inner casing having open ends, an opaque outer protective casing having open ends snugly containing said inner casing, a compressible bulb secured over an open end of the inner casing operable to draw liquid through the other end into the casing, a hydrometer float disposed within said inner casing coöperating with said casing for guided movement therein, said hydrometer having a pointer, and said opaque outer casing having a longitudinal slot therein through which said pointer is visible and indications adjacent said slot.

2. The combination, of a transparent inner casing having open ends, an opaque outer protective casing having open ends snugly containing said inner casing, said inner casing extended somewhat beyond the corresponding end of the outer casing, a flexible rubber tube removably received over said extended end of said inner casing and also over the end of said outer casing, a compressible bulb secured over the other end of said inner casing operable to draw liquid within said casing, a hydrometer float disposed within said inner casing coöperating with said casing for guided movement therein, said hydrometer having a pointer, and said opaque outer casing having a longitudinal slot therein through which said pointer is visible and indications adjacent said slot.

3. The combination, of a transparent inner casing having a body portion and a reduced stem portion and open ends, an opaque outer protective casing having open ends and generally conforming to the shape of and snugly containing said inner casing, a compressible bulb secured over the top end of the inner casing operable to draw liquid through the other end into the casing, a hydrometer float disposed within said inner casing coöperating with said casing for guided movement therein, said hydrometer having a pointer, and said opaque outer casing having a longitudinal slot therein through which said pointer is visible and indications adjacent said slot.

4. The combination, of a casing of substantial length having open ends, a compressible bulb secured to said casing over one end operable to draw liquid through said other end into the casing, a hydrometer float disposed within said casing coöperating with said casing for guided movement therein, said float having a lower float portion and a stem extended thereabove, a pointer carried by said stem, and a plurality of indications on the exterior of said casing at the bulb end thereof coöperating with said pointer to indicate the gravity of the liquid tested.

In testimony whereof I have signed my name to this specification in the presence of two subscribing witnesses.

LOUIS J. STERN.

Witnesses:
   T. T. Greenwood,
   H. B. Davis.